(12) United States Patent
Ohtsuji (10) Patent No.: US 7,769,506 B2
(45) Date of Patent: Aug. 3, 2010

(54) DRIVER ASSISTANCE SYSTEM CONTROLLER AND DRIVER ASSISTANCE CONTROL METHOD FOR VEHICLES

(75) Inventor: Shinya Ohtsuji, Tokai (JP)

(73) Assignee: Hitachi, Ltd., Tokyo (JP)

( * ) Notice: Subject to any disclaimer, the term of this patent is extended or adjusted under 35 U.S.C. 154(b) by 443 days.

(21) Appl. No.: 11/780,235

(22) Filed: Jul. 19, 2007

(65) Prior Publication Data

US 2008/0033625 A1    Feb. 7, 2008

(30) Foreign Application Priority Data

Aug. 7, 2006    (JP)    ............... 2006-214286

(51) Int. Cl.
*G01C 22/00* (2006.01)
(52) U.S. Cl. .................................................. 701/25
(58) Field of Classification Search .................. 701/25, 701/28, 93, 200, 207–210, 212–213, 301; 348/142–143, 148–149; 382/103–104, 106
See application file for complete search history.

(56) References Cited

U.S. PATENT DOCUMENTS

| 7,205,888 | B2 | 4/2007 | Isaji et al. |
| 7,634,110 | B2 * | 12/2009 | Oka et al. ................ 382/104 |
| 2005/0004743 | A1 | 1/2005 | Kojima et al. |

| 2009/0088978 | A1 * | 4/2009 | Ishikawa et al. ............ 701/223 |

FOREIGN PATENT DOCUMENTS

| EP | 1 564 062 A2 | 8/2005 |
| JP | 10-81156 A | 3/1998 |
| JP | 2003-205805 A | 7/2003 |
| JP | 2004-86363 A | 3/2004 |
| JP | 2005-170154 A | 6/2005 |
| JP | 2005-253642 A | 9/2005 |

OTHER PUBLICATIONS

Japanese Office Action including English translation dated Sep. 16, 2008 (Five (5) pages).
European Search Report dated Jan. 8, 2008. (Five (5) pages).

* cited by examiner

*Primary Examiner*—Kim T Nguyen
(74) *Attorney, Agent, or Firm*—Crowell & Moring LLP (57) ABSTRACT

There are provided a navigation apparatus, a forward recognition apparatus using a camera or the like, which can capture a situation around the vehicle and calculate a distance to a particular object and a relative velocity, and sensors mounted on the vehicle to acquire the driving status of the vehicle. Whether to continue or suspend driver assistance control based on output information from the forward recognition apparatus using a camera or the like is determined according to driving environment information obtained from the navigation apparatus or the forward recognition apparatus using a camera or the like. If the visibility is determined to be poor from information from the sensors, the driver assistance control based on the output information from the forward recognition apparatus is suspended.

7 Claims, 9 Drawing Sheets

DRIVER ASSISTANCE SYSTEM CONTROLLER AND DRIVER ASSISTANCE CONTROL METHOD FOR VEHICLES

CLAIM OF PRIORITY

The present application claims priority from Japanese application serial No. 2006-214286, filed on Aug. 7, 2006, the content of which is hereby incorporated by reference into this application.

FIELD OF THE INVENTION

The present invention relates to a driver assistance system controller and a driver assistance control method for vehicles; the system and method use a forward recognition unit using a camera or the like and a road information acquisition means such as navigation unit to assist drivers.

BACKGROUND OF THE INVENTION

At present, driver assistance technologies, including adaptive cruise control (ACC), for providing various types of driver assistance are used in practical applications. A driver assistance apparatus is used to implement a system in which a radar and external sensors, mainly used for camera image recognition, are mounted on a vehicle to recognize and decide a situation around a vehicle; according to the situation, an alarm or a notification is given to the driver to promote the driver to decrease the velocity or stop the vehicle, and driver assistance for the vehicle is controlled. Navigation apparatuses are also mounted in many recent vehicles.

The present invention addresses driver assistance control as main technology in which external sensors, which are typified by cameras, are used to recognize particular objects (such as stop lines, crossing lines, and other markers on roads), calculates a distance up to the object, and control driver assistance so as to make the vehicle velocity at the point of the feature approach a target velocity. In control based on peripheral recognition by camera image recognition, a distance up to which recognition is possible is as short as tens of meters, so the correct distance cannot be recognized until the vehicle approaches the object. When information provided by a navigation apparatus is used, the distance from the driving position of the vehicle to a target point can be obtained even when the target point is far from the vehicle. However, vehicle positions estimated by navigation apparatuses may include large estimation error ranging from several meters to tens of meters; contrary to the use of camera image recognition, the vehicle is easily affected by the estimation error as it approaches the target, and thus correct control cannot be implemented. Accordingly, when large deceleration is required gradually for example, to automatically stop until the target is reached, a switchover as disclosed in Patent Document 1 is preferable. Specifically, driver assistance is controlled by making a switchover as follows: when the target point is far from the vehicle, distance information based on navigation information is used; when the target point is approached, more accurate information provided by external sensors such as cameras or the like is used.

In driver assistance control using external sensors, control based on sensor information must be usually stopped in a situation in which the reliability of the sensor information is substantially lowered. For example, in driver assistance control using a camera image recognition apparatus as disclosed in Patent Document 2, the driver assistance system controller cancels following distance control or constant-velocity driver assistance control according to the weather and road condition because distance detection performance is lowered in falling weather such as rainy weather.

[Patent Document 1] Japanese Patent Laid-open No. 2004-86363

[Patent Document 2] Japanese Patent Laid-open No. Hei 10(1998)-81156

SUMMARY OF THE INVENTION

Not only weather but also a forward road shape may affect visibility and thus lower the recognition performance in camera image recognition. If the forward road cannot be seen clearly due to its shape, even when the camera operates normally, objects on the target road cannot be detected. At such a point, it is dangerous that control is performed by relying on camera information as usual.

An object of the present invention is to provide a driver assistance system controller and a driver assistance control method in driver assistance control for vehicles that implements driver assistance on the basis of information from a forward recognition apparatus using a camera or the like, so that driver assistance can be executed within a safe range even when a forward road has a shape that impairs outlook from the forward recognition apparatus.

In one aspect of the present invention, a decision means is provided, which decides whether to continue or suspend driver assistance control based on output information from the forward recognition apparatus, according to road shape information obtained from a forward recognition apparatus that uses a camera or the like and/or a road information acquisition means such as a navigation apparatus.

In a preferable embodiment of the present invention, when information indicating that the road shape impairs outlook in front of the vehicle is received from the navigation apparatus, a decision is made to suspend driver assistance control based on the output information from the forward recognition apparatus using a camera or the like.

In the preferable embodiment of the present invention, road shapes that impair outlook in front of the vehicle include the front of a tunnel, the front of the top of an uphill, and/or the front of a blind curve.

In the preferable embodiment of the present invention, the decision means decides not to allow the use of the output information from the navigation apparatus when a distance, which is output by the navigation apparatus, up to a particular point falls to or below a prescribed value.

In the preferable embodiment of the present invention, an acoustic guidance means is provided, which generates a sound in the vehicle to indicate suspension of the driver assistance control when it is suspended.

In another aspect of the present invention, there is provided an information output means, which adds information that indicates whether the output information from the forward recognition apparatus is valid according to the road shape information obtained from the forward recognition apparatus and/or the road information acquisition means.

In still another aspect of the present invention, there is provided a priority deciding means, which determines which of the output information from the road information acquisition means and the output information from the forward recognition apparatus is to be given priority in execution of the driver assistance control, according to the road shape information obtained from the forward recognition apparatus and/or the road information acquisition means.

In the preferable embodiment of the present invention, a meter section in the vehicle, the screen of the navigation apparatus, or the like provides a display to indicate which of the output information from the forward recognition apparatus using a camera or the like and the output information from the navigation apparatus is being used to execute the driver assistance control.

In a driver assistance system controller for vehicles that implements driver assistance on the basis of information from a forward recognition apparatus using a camera or the like, a preferred embodiment of the present invention provides a driver assistance system controller and a driver assistance control method, so that driver assistance can be executed within a safe range even when a forward road has a shape that impairs outlook from the forward recognition apparatus.

Other objects and features of the present invention will be clarified in examples described below.

DESCRIPTION OF THE PREFERRED EMBODIMENTS

Preferred example in the present invention will be described in detail with reference to the drawings.

First Embodiment

This embodiment will be described as an embodiment of driver assistance control, assuming automatic stop control by which a vehicle is automatically stopped at a stop line.

Figure 1:
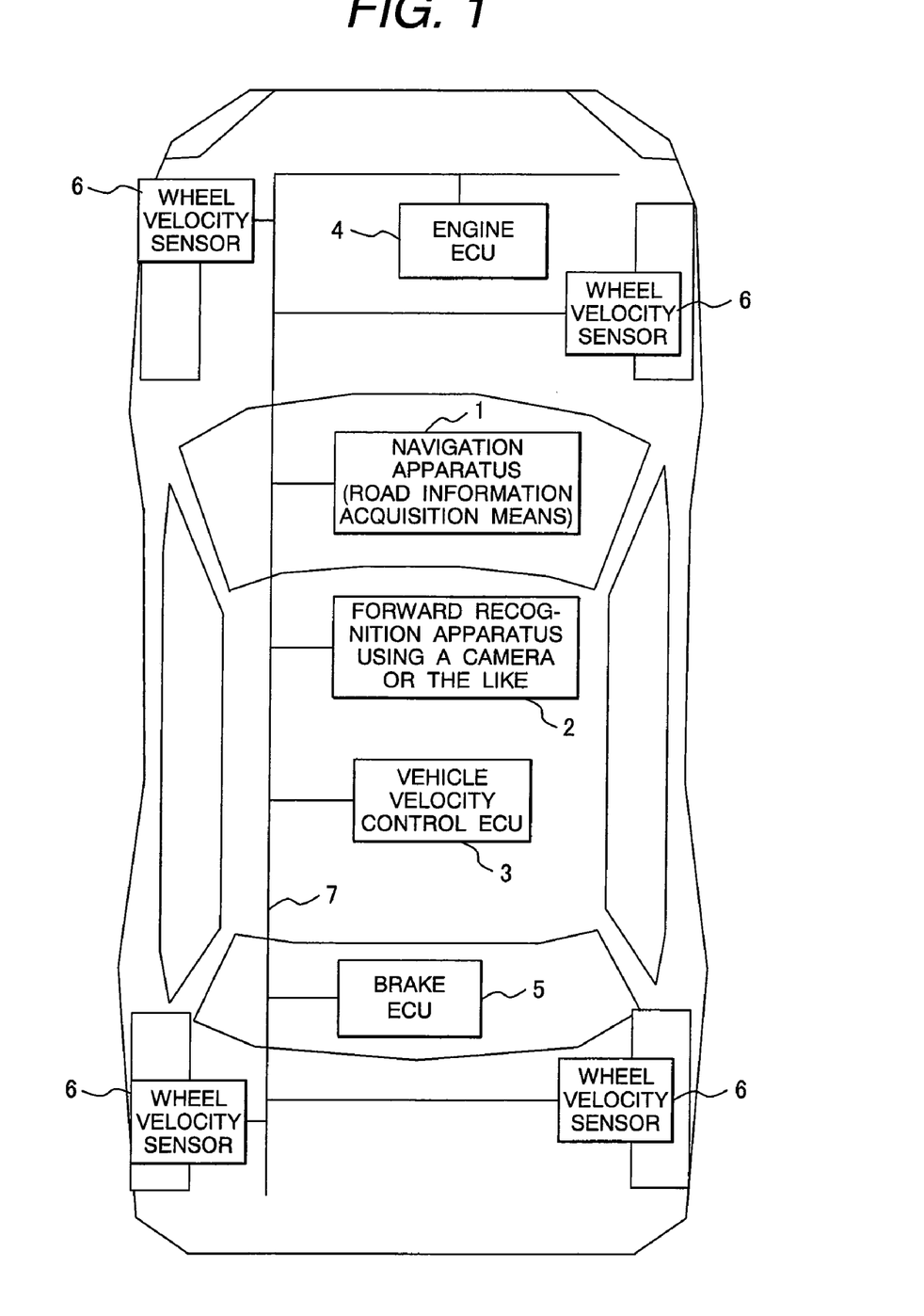
FIG. 1 is an overall structural view of a driver assistance system controller for vehicles according to a first example of the present invention.

FIG. 1 is an overall structural view of a driver assistance system controller for vehicles according to a first embodiment of the present invention. As shown in FIG. 1, the driver assistance system controller in the first embodiment has a navigation apparatus 1 for estimating an outlook state in front of the vehicle from the shape of a road from the driving position of the vehicle to a particular feature point. The driver assistance system controller also has a forward recognition apparatus 2, which uses a camera or another device capable of measuring a distance up to a particular feature around the vehicle from image data, and a vehicle velocity control electronic control unit (ECU) 3 for obtaining a valid control command value at the current driving position from information about the distance so that a target velocity is reached at the particular feature point. Also provided are an engine ECU 4 and brake ECU 5 for controlling the vehicle velocity according to a control command request from the vehicle velocity control ECU 3, as well as wheel velocity sensors 6, each of which measures the revolutions (wheel velocity) Vw of a wheel, and a communication bus 7 for connecting these components, configuring a system.

The navigation apparatus 1 has a map database; it can estimate the position of the vehicle from global positioning system (GPS) information and other sensor information, and then calculates a distance between a particular feature point in map data and the vehicle position. The map database (not shown) includes points on roads, stop lines in road segments, crossing line segments, tunnels, and other feature information such as velocity restriction information. The other sensor information includes acceleration sensor information and gyro sensor information.

How processing flows in individual constituent components in halt processing performed by the driver assistance system controller will be described below.

The navigation apparatus 1 obtains driving road path information within a particular range in front of the position of the vehicle and also obtains road attribute information and feature information within the particular range together with road shape information (positions of nodes and information of their links). The road attribute information and feature information are, for example, curvature information and slope information of a road at each node. Alternatively, these information items may be information about the presence attribute of an object such as a building beside a node.

Figure 2:
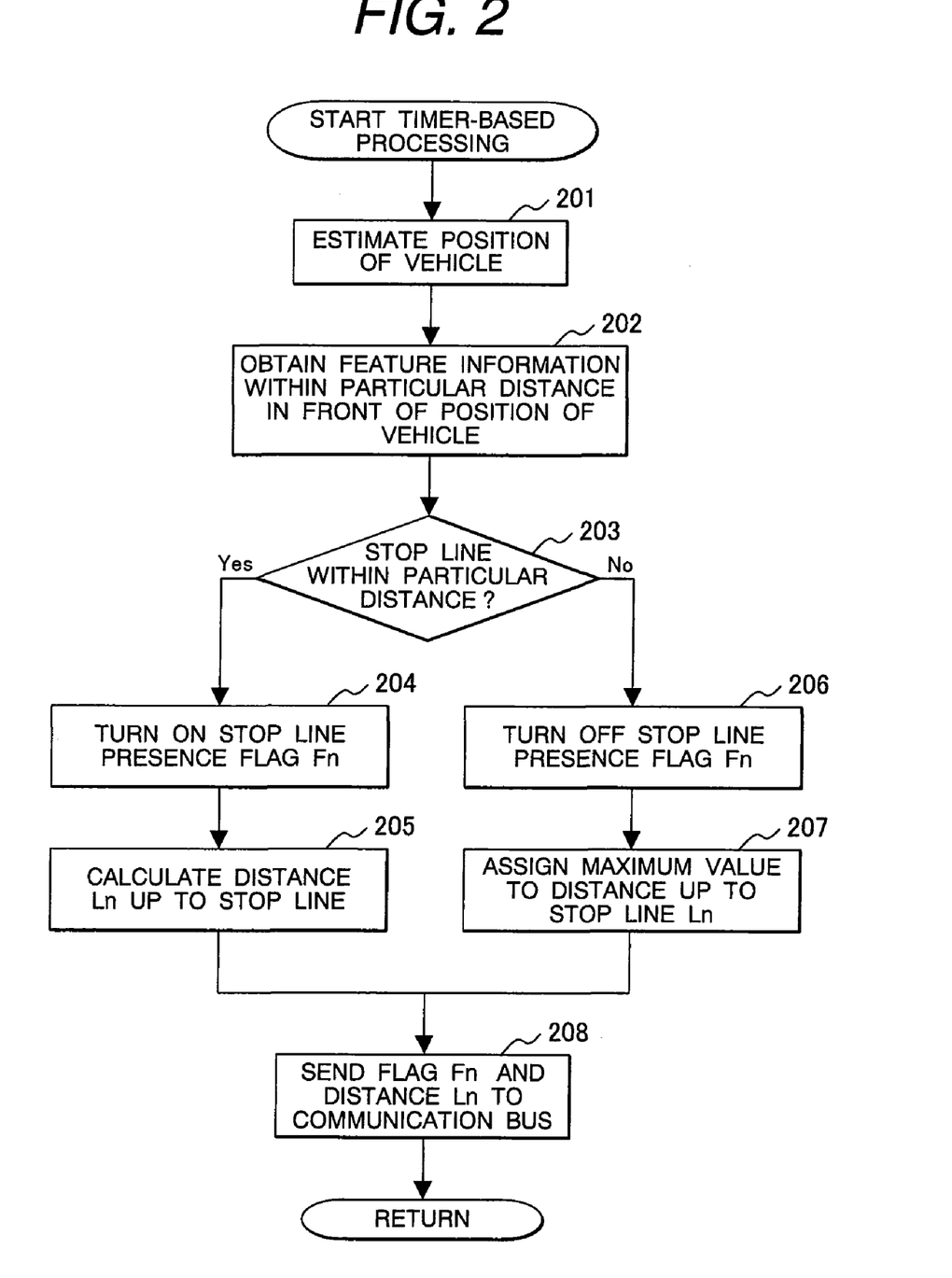
FIG. 2 is a flowchart indicating ordinary processing by a navigation apparatus 1 in the first example of the present invention.

FIG. 2 is a flowchart indicating ordinary processing by the navigation apparatus 1 in the first embodiment of the present invention. The navigation apparatus 1 performs processing described below at fixed intervals. First, the position of the vehicle is estimated from GPS information and other sensor information in step 201. Feature information within a particular distance in front of the estimated vehicle position is obtained from the map database in step 202. Whether there is a stop line within the particular distance in front in a prescribed driving direction is checked in step 203. If there is a stop line in the range, a stop line presence flag Fn based on the navigation apparatus is turned on in step 204, and a distance up to the stop line Ln is calculated in step 205. If there is no stop line, the flag Fn is turned off in step 206 and, in step 207, the value of the distance Ln is set to a large prescribed value, such as, for example, a maximum value that the distance Ln can take. Information about the flag and distance is sent to the communication bus 7 in step 208.

Figure 3:
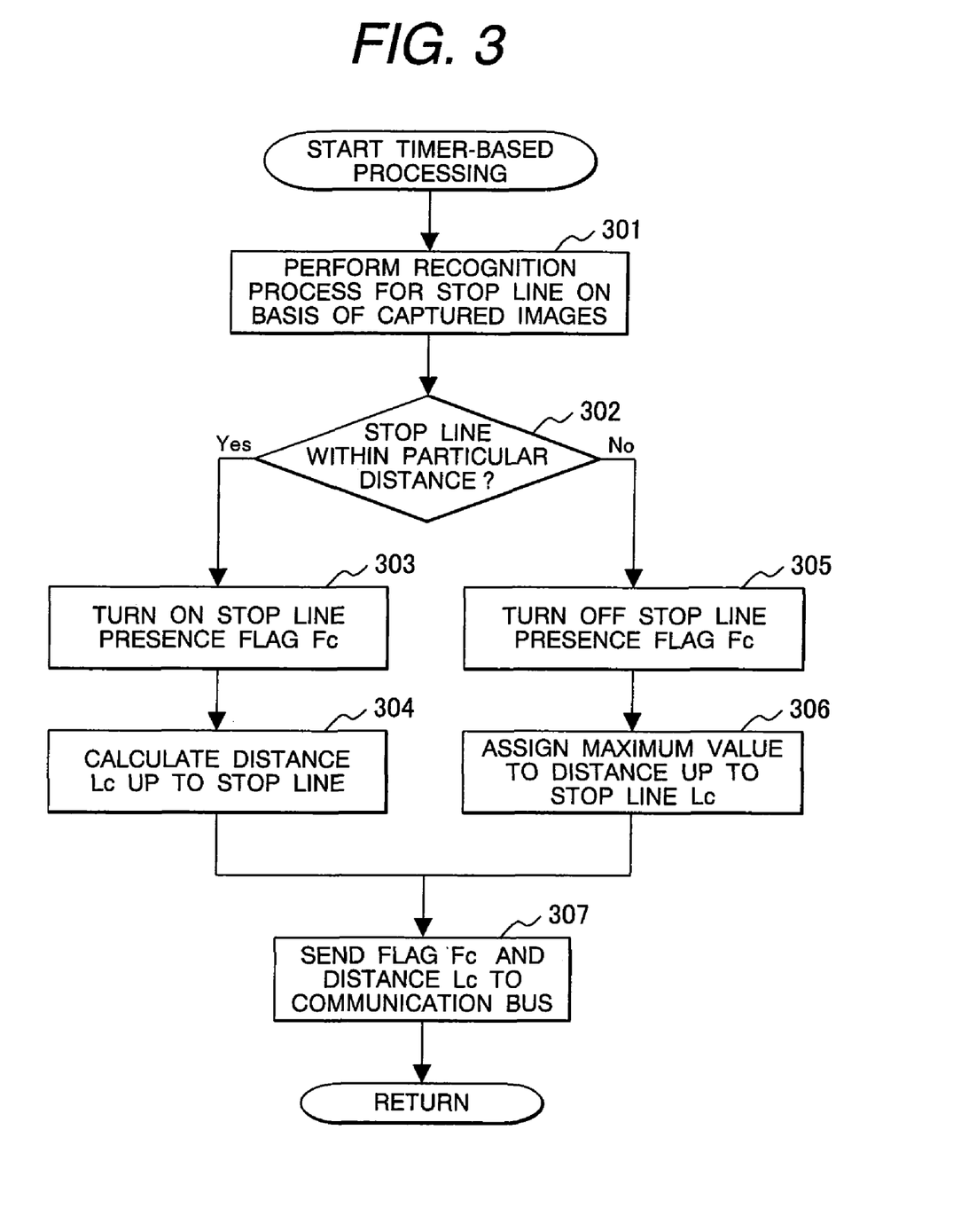
FIG. 3 is a flowchart indicating ordinary processing by a forward recognition apparatus 2 using a camera or the like in the first example of the present invention.

FIG. 3 is a flowchart indicating ordinary processing by the forward recognition apparatus 2 using a camera or the like in the first embodiment of the present invention. The forward recognition apparatus 2 also performs processing described below at fixed intervals, in parallel to the processing by the navigation apparatus 1. In step 301, a process for recognition of a stop line is executed by use of images captured by the camera. Whether there is a stop line in the captured images is determined in step 302. If a stop line is detected in an image captured in front of the vehicle, a stop line presence flag Fc based on camera recognition is turned on in step 303 and a distance Lc up to the stop line is obtained by an image process in step 304. If there is no stop line, the Fc flag is turned off in step 305 and, in step 306, the value of the distance Lc is set to a large prescribed value, such as, for example, a maximum value that the distance Lc can take. Information about the flag and distance is sent to the communication bus 7 in step 307.

Figure 4:
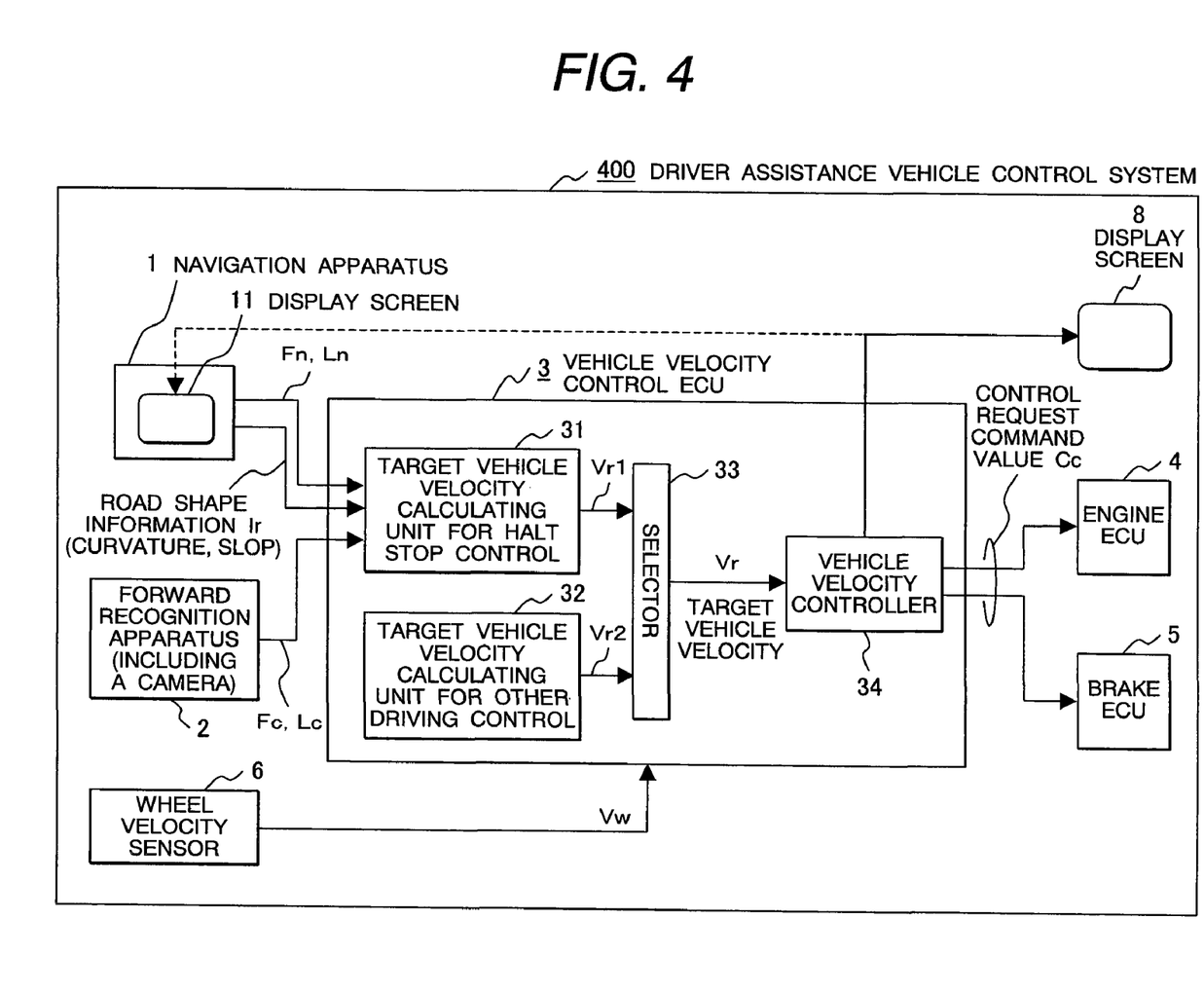
FIG. 4 shows the structure of the driver assistance system controller for vehicles in the first example of the present invention.

FIG. 4 shows the structure of the driver assistance system controller for vehicles in the first embodiment of the present invention, and particularly shows a specific control functional block diagram for the vehicle velocity control ECU 3.

The vehicle velocity control ECU 3 comprises a target vehicle velocity calculating unit 31 for halt stop control, another target vehicle velocity calculating unit 32 for other driving control, a selector 33, and a vehicle velocity controller 34. The target vehicle velocity calculating unit 31 for halt stop control calculates a first target vehicle velocity Vr1 from the flag Fn, the distance Ln, the road shape information Ir in front of the vehicle, such as curvature information and slope information, the flag Fc, and the distance Lc, these parameters being input information from the navigation apparatus 1 and forward recognition apparatus 2. The target vehicle velocity calculating unit 32 for other driving control calculates a second target vehicle velocity Vr2, such as a target vehicle velocity involved in other than halt control, such as ordinary ACC control. The selector 33 receives the target vehicle velocities Vr1 and Vr2 from the calculating units 31 and 32, selects a minimum value, for example, and determines a final target vehicle velocity Vr. The vehicle velocity controller 34 obtains a control request command value Cc to be sent to the engine ECU 4 and brake ECU 5 to achieve the target vehicle velocity Vr.

The vehicle velocity controller 34 displays the state of driver assistance control on a display screen 8 of a meter in the vehicle or a display screen 11 of the navigation apparatus 1 to notify the driver. Although details will be described later, the driver is notified that, for example, driver assistance control based on the output information from the forward recognition apparatus 2 is being executed or suspended, which of the output information from the navigation apparatus 1 and the output information from the forward recognition apparatus 2 is used for driver assistance control, and whether driver assistance is performed on the basis of the output information from both apparatuses.

Figure 5:
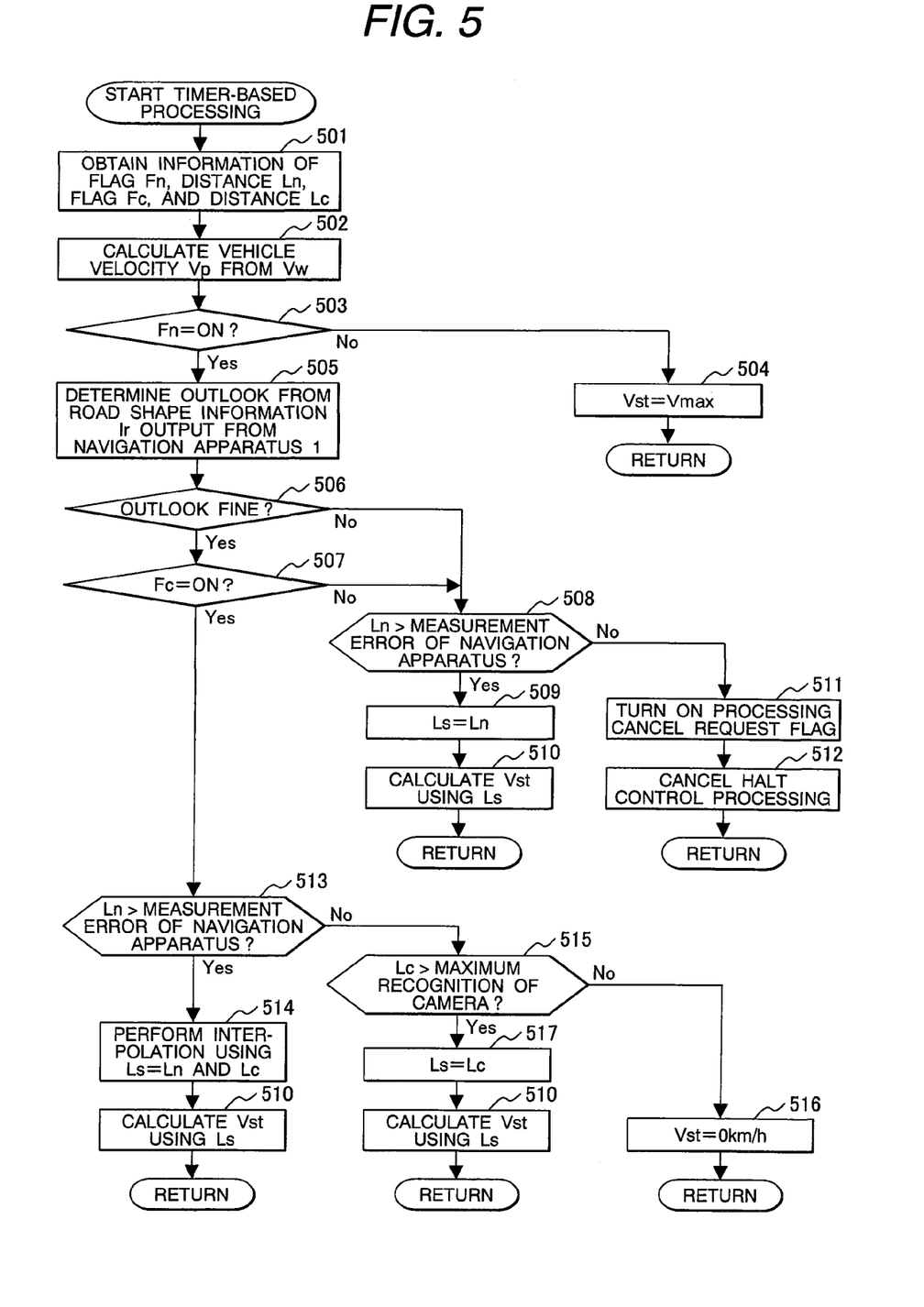
FIG. 5 is a flowchart indicating processing by a target vehicle velocity calculating unit 31 for halt stop control in a vehicle velocity control ECU 3 in the first example of the present invention.

FIG. 5 is a flowchart indicating processing by the target vehicle velocity calculating unit 31 for halt stop control in the vehicle velocity control ECU 3 in the first embodiment of the present invention. The target vehicle velocity calculating unit 31 executes processing described below at fixed intervals (10 ms, for example) to obtain a valid target vehicle velocity Vr at the current driving position.

In step 501, the target vehicle velocity calculating unit 31 obtains, through the communication bus 7, the flag Fn and distance information Ln sent from the navigation apparatus 1 as well as the flag Fc and distance information Lc sent from the forward recognition apparatus 2. In step 502, the target vehicle velocity calculating unit 31 also obtains the wheel velocity Vw from the wheel velocity sensors 6 at the time of current driving, and calculates the current vehicle velocity Vp from the obtained value by use of the radius of the mounted tires. In step 503, it is checked from the information received from the flag Fn whether the navigation apparatus 1 has detected a halt line in a prescribed range. If the flag Fn shows a value indicating that the flag is turned off (0, for example), the processing proceeds to step 504, and the target velocity Vst for halt control is set to a maximum value Vmax because there is no stop line in the prescribed range. This means, for example, that the selector 33, which comprises a circuit with a low priority, selects the target vehicle velocity for other driving control. If the flag Fn shows a value (1, for example) indicating that the flag is turned on, the processing proceeds to step 505, and an outlook decision process, described later in detail, is executed because a stop line has been detected in the prescribed range. If the outlook is determined to be fine in step 506, the flag Fc in the forward recognition apparatus 2 is checked in step 507 to see whether a stop line has been detected.

If the flag Fc based on a camera or the like shows a value (0, for example) indicating that the flag is turned off, halt driver assistance control is performed according to the information from the navigation apparatus 1 because the forward recognition apparatus 2 has not detected a stop line. In this case, it is determined in step 508 whether the distance information Ln from the navigation apparatus 1 is greater than measurement error that is inevitable due to limitation of the performance of the navigation apparatus 1. That is, it is determined whether the vehicle has approached the stop line to an extent where control by the navigation apparatus 1 is not possible. If the distance from the navigation apparatus 1 to the stop line is equal to or shorter than the measurement error, the vehicle is too close to the stop line for the navigation apparatus 1 to perform control, so the processing proceeds to step 511 and a cancel request signal flag is turned on so that the halt control processing is canceled. When the cancel request signal flag is turned on, the vehicle velocity controller 34 cancels the halt control processing in step 512.

If the distance from the navigation apparatus 1 to the stop line is equal to or longer than the measurement error, execution of driver assistance control based on the output information from the navigation apparatus 1 is appropriate, so the distance Ls, used for halt control, up to the stop line is set to the distance Ln based on the navigation apparatus in step 509. The target velocity Vst for halt control is then calculated from the value of the distance Ls (=Ln) at that time in step 510. This calculation is performed according to equation (1), which is an ordinary equation; β in this equation is a deceleration velocity used to perform control so that the vehicle velocity is reduced at a fixed deceleration velocity until the vehicle stops at the stop line.

$$Vst=\sqrt{(2\beta Ls)} \quad (1)$$

If it is found from the results of the outlook check in step 507 that the flag Fc shows a value (1, for example) indicating that the flag is turned on, the forward recognition apparatus 2 has detected a stop line. In this case, both the value of the distance Ln, which is output information from the navigation apparatus 1, and the value of the distance Lc, which is output information of the forward recognition apparatus 2 using a camera or the like, can be used. Accordingly, halt control is performed on the basis of the distance Ln and the distance Lc. If the decision in step 513 indicates that the value of the distance Ln is equal to or less than the measurement error of the navigation apparatus 1, the vehicle is already too close for the navigation apparatus 1 to implement driver assistance, so control is performed on the basis of only the distance information Lc from the forward recognition apparatus 2. If it is then determined in step 515 that a change in the numerical value of the distance Lc indicates that the vehicle is too close to the stop line and the angle of view of the camera indicates that the maximum recognition distance of a known camera is reached, the vehicle is sufficiently close to the stop line. Accordingly, the target velocity Vst for halt control is set to 0 km/h in step 516. Otherwise, assuming that the value of the target distance Ls equals the distance Lc output from the forward recognition apparatus 2 in step 517, the target velocity Vst for halt control is calculated from the value of the target distance Ls (=Lc) at that time in step 510. If the decision result in step 513 indicates that the value of the distance Ln is equal to or greater than the measurement error, the target distance Ls is calculated in step 514 as an interpolated value, described later, which is obtained from both the distance Ln from the navigation apparatus 1 and the distance Lc output from the forward recognition apparatus 2. The target velocity Vst for halt control is then calculated from the target distance Ls obtained in this way in step 510.

In this processing flow, the decision process in step 507 may be placed immediately before step 505.

The above outlook check process in steps 505 and 506 will be described below in detail.

Information that the vehicle velocity control ECU 3 receives from the navigation apparatus 1 includes not only the road shape information in front of the driving position of the vehicle and information at special points such as a point before the vehicle enters a dark place such as a tunnel, as described above, but also curvature information and slope information about nodes. If the curvatures of a plurality of nodes in front of the vehicle are large to the right and left, the shape is estimated to be a chicane shape. If there is a stop line in front of these nodes, the visibility of the camera is predicted to be poor. Accordingly, if such a tunnel or a change in curvature is detected in front of the vehicle in step 505, the outlook is determined to be poor in subsequent step 506. As another case, consider that there is a stop line in front of a point at which the numerical value of a slope turns to decrease. It is then estimated from slope information about a plurality of nodes in front of the vehicle that the stop line is present on the top of an uphill or in front of a point from which a downhill starts. In this case as well, the visibility of the camera is predicted to be poor and the outlook is thus determined to be poor in step 506. In addition, there may be an object beside a node and the curvature may be large. In this case, it is estimated from information about the presence of the object beside the node and the curvature information that there is a blind curve in front of the vehicle. The outlook is determined to be poor in step 506.

In step 514, both the distance Ln from the navigation apparatus 1 and the distance Lc from the forward recognition apparatus 2 using a camera or the like have been used to perform calculation for interpolation for the target distance. How to perform the calculation will be specifically described below.

When the distance information Lc is acquired from the forward recognition apparatus 2, a match is not always found between the distance information Ln from the navigation apparatus 1 and the distance information Lc from the forward recognition apparatus 2 due to their measurement accuracies. In this embodiment, when the distance information is received from both apparatuses, therefore, the stop line distance Ls is obtained with the distance information Ln from the navigation apparatus 1 being initially weighted. After that, interpolation is performed to obtain the stop line distance Ls with the distance information Lc from the forward recognition apparatus 2 being weighted with time. To interpolate stop line distance Ls(t) at time t, equation (2) below can be used.

$$Ls(t)=x(t)\times Ln(t)+(1-x(t))\times Lc(t) \quad (2)$$

where x(t) equals Lc(t)/Lc(0), t is the current time, and Lc(0) is distance information from the forward recognition apparatus 2 using a camera at the start of reception.

Figure 6:
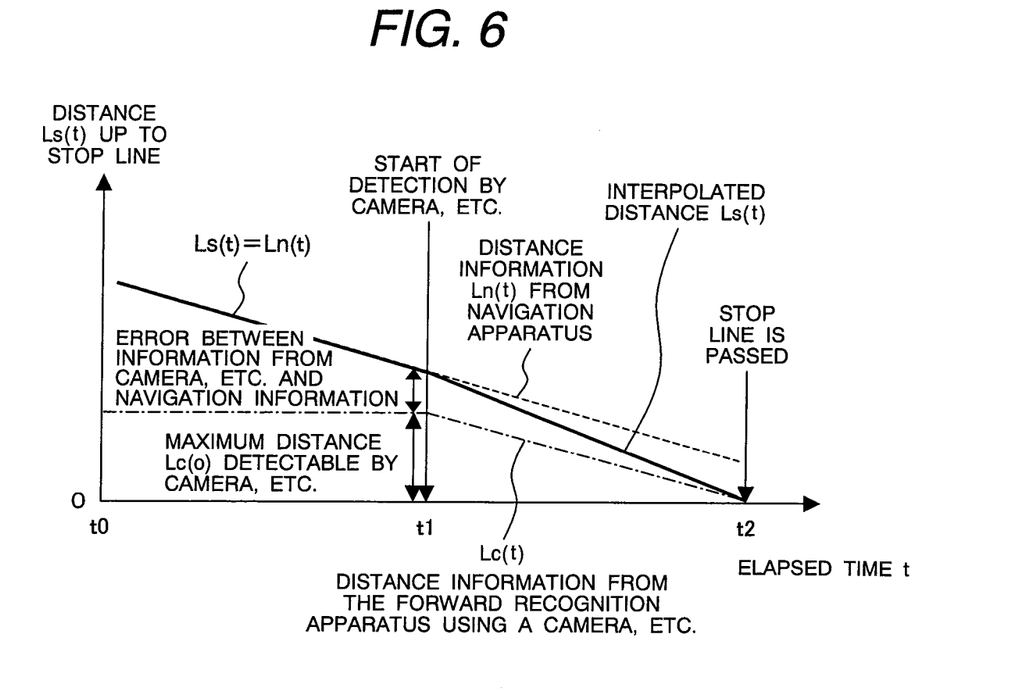
FIG. 6 is a graph illustrating calculation of a stop line distance in the first example of the present invention.

FIG. 6 is a graph illustrating calculation of the stop line distance Ls according to equation (2) above in the first embodiment of the present invention. Even if there is a difference between the distance information Ln from the navigation apparatus 1 and the distance information Lc from the forward recognition apparatus 2 at an initial time when both distance information items are received, as shown in this drawing, the distance information is smoothly interpolated, making behavior at the time of braking stable.

Specifically, the distance from the current position of the vehicle to the stop line is long in a period from time t0 to time t1, so the target distance Ls(t) is obtained from the distance information Ln(t) from the navigation apparatus 1. Accordingly, the target distance Ls(t) equals the target distance Ln(t), as indicated by a solid bold line. When the vehicle becomes capable of detecting the stop line with the camera in the forward recognition apparatus 2 at time t1, the accuracy for detection of the distance information Lc(t) from the forward recognition apparatus 2 by the camera or the like is gradually increased until the stop line is reached at time t2, as indicated by a dash-dot line. Conversely, the accuracy for detection of the distance information Ln(t) from the navigation apparatus 1 is gradually decreased, as indicated by a dashed line. In a period from t1 to t2, the interpolated distance Ls(t) is then obtained from both the distance information Ln(t) and the distance information Lc(t) according to equation (2), on the basis of which driver assistance control is executed until the stop line is reached.

Figure 7:
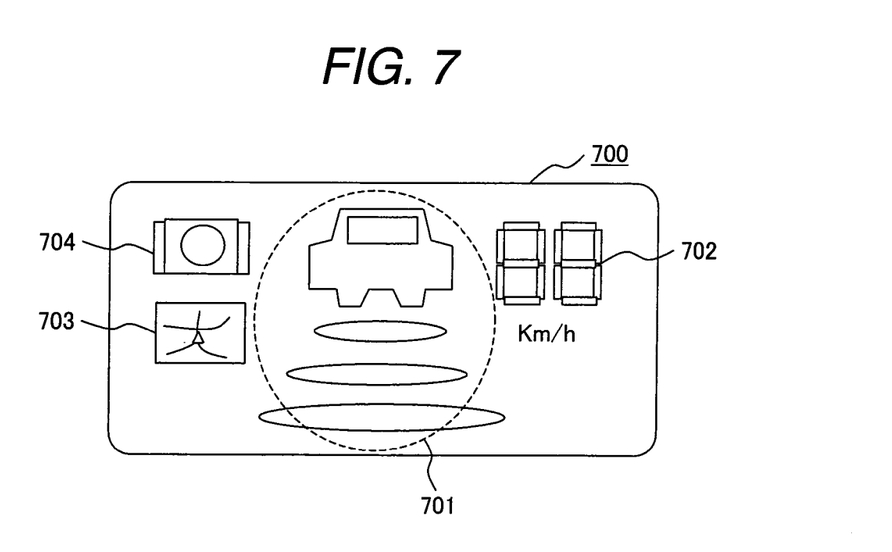
FIG. 7 shows an exemplary screen display of a driver-oriented display unit in the first example of the present invention.

FIG. 7 shows an exemplary screen display of a driver-oriented display unit in the first embodiment of the present invention. A display part 700 is provided to notify the driver which of information from the forward recognition apparatus 2 using a camera or the like and information from the navigation apparatus 1 is used for the current driver assistance control. The display part may be given on the display screen 8 on the meter console or the display screen 11 of the navigation apparatus 1 shown in FIG. 4. The display part 700 may be given in any place if the display part is visible to the driver. In FIG. 7, the display part 700 is assumed to be given on the display screen 11 of the navigation apparatus 1. In the display part 700, reference numeral 701 indicates a display of the presence of a forward vehicle, and reference numeral 702 indicates a display of a target vehicle velocity of the ACC. When, for example, the vehicle is far from the stop line and driver assistance control is in progress on the basis of only the information from the navigation apparatus 1, an icon 703 is turned on to indicate that control based on information from the navigation apparatus 1 is in progress. When control is in progress on the basis of only the information from the forward recognition apparatus 2 using a camera or the like, an icon 704 is turned on to indicate that control based on information from the camera or the like is in progress. When both the information from the navigation apparatus 1 and the information from the forward recognition apparatus 2 are used for control as in step 514 in FIG. 5, both the icons 703 and 704 are turned on. When neither the information from the navigation apparatus 1 nor the information from the forward recognition apparatus 2 is used, neither of these icons is turned on. These icons may be graphically represented shown in FIG. 7 or represented as characters. The positions of the icons do not need to be limited if they are disposed at positions at which they are recognizable.

When the vehicle velocity controller 34 cancels driver assistance control for a halt in step 512 in FIG. 5, an alarm sound or voice information is output from a speaker (not shown) mounted in the vehicle to notify the driver that the driver assistance control has been suspended.

Second Embodiment

Figure 8:
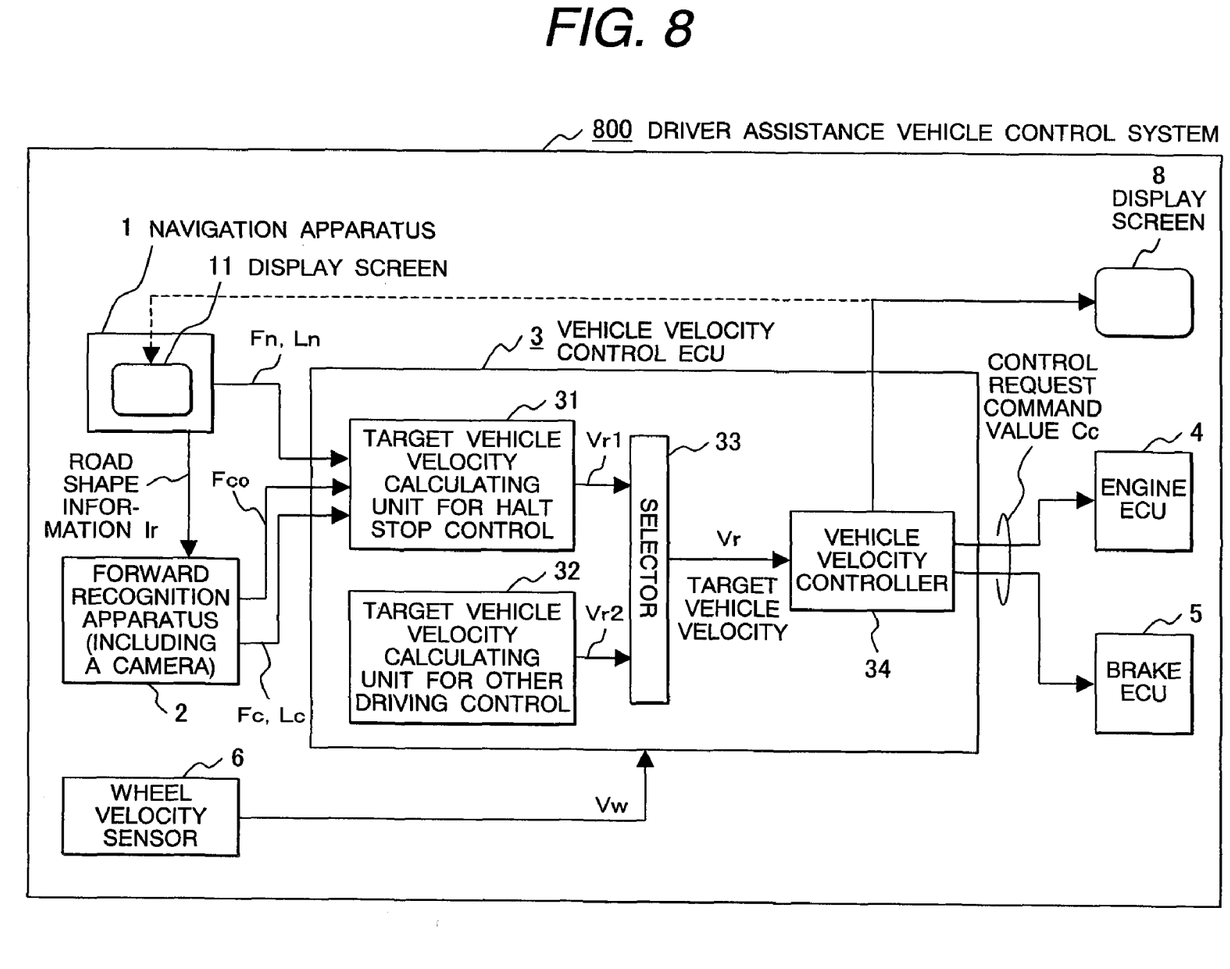
FIG. 8 is a structural view of a driver assistance system controller for vehicles according to a second example of the present invention.

FIG. 8 is a structural view of a driver assistance system controller for vehicles according to a second embodiment of the present invention, and particularly illustrates how information from the navigation apparatus 1 and forward recognition apparatus 2 is handled as well as a functional block diagram of the vehicle velocity control ECU 3.

The basic structure in the second embodiment is the same as the basic structure in the first embodiment in FIG. 4 except that the forward recognition apparatus 2 receives the road shape information Ir from the navigation apparatus 1 and sends, to the vehicle velocity control ECU 3, validity information Fco for the output information from the forward recognition apparatus 2.

Road shape information Ir is sent from the navigation apparatus 1 to the forward recognition apparatus 2. A validity information flag Fco corresponding to the output from the forward recognition apparatus 2 is output to the vehicle velocity control ECU 3, according to the result of a decision made by the forward recognition apparatus 2 for outlook. In the target vehicle velocity calculating unit 31 for halt stop control in the vehicle velocity control ECU 3 that has received the flag, a decision in outlook check process steps 505 and 506 shown in FIG. 5 is made according to the status value of the flag Fco received in the second embodiment. That is, control is performed so that when the status flag Fco is turned on, a Yes result is produced in step 506; when the status flag Fco is turned off, a No result is produced in step 506. Other processing is the same as in the first embodiment in FIGS. 4 and 5, so duplicate explanation will be omitted.

Figure 9:
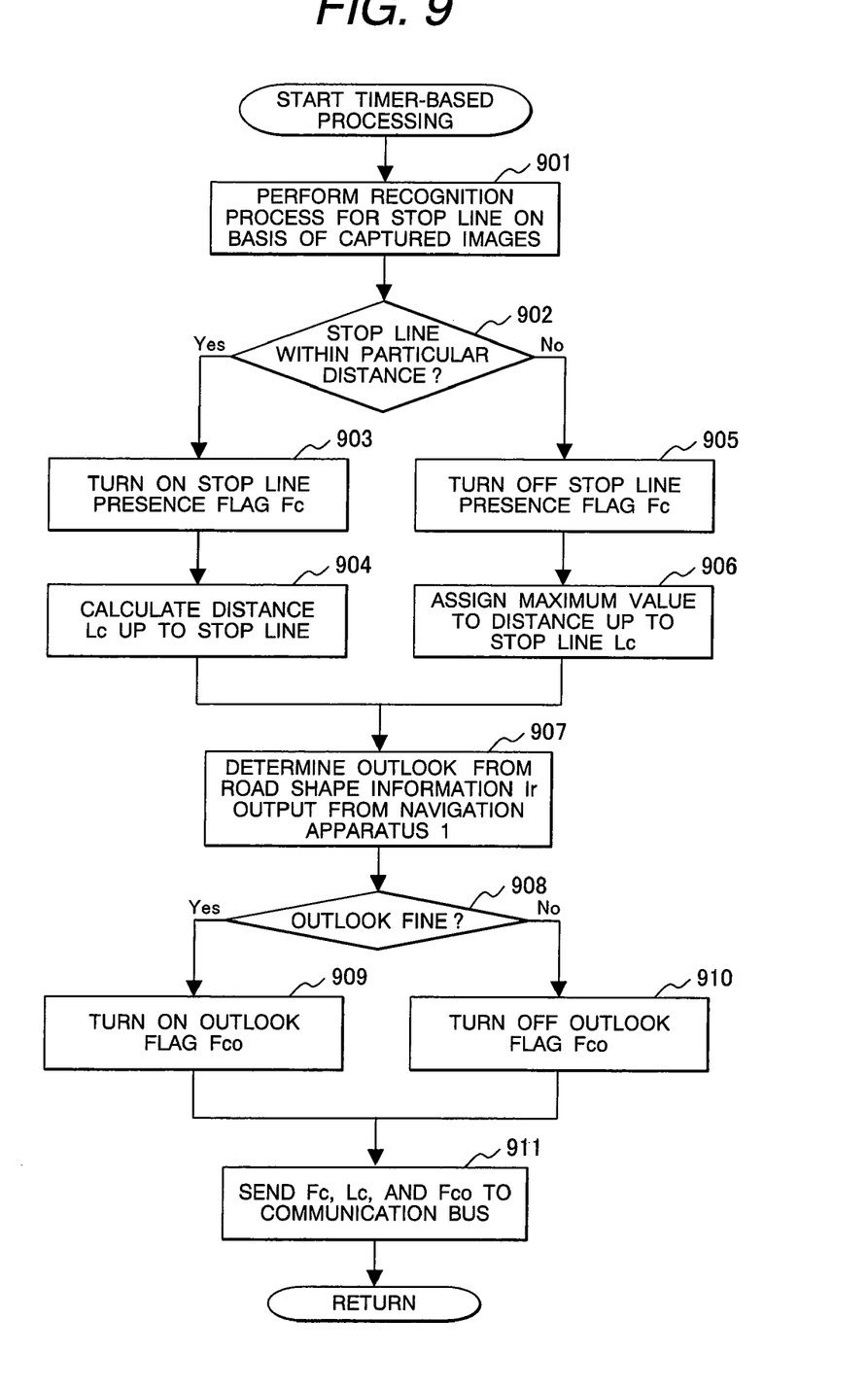
FIG. 9 is a flowchart indicating ordinary processing by the forward recognition apparatus 2 in the second example of the present invention.

FIG. 9 is a flowchart indicating ordinary processing by the forward recognition apparatus 2 in the second embodiment of the present invention. The forward recognition apparatus 2 executes processing described below at fixed intervals. A recognition process is executed for a stop line by use of images captured by the camera in step 901. Whether there is a stop line on a captured image is determined in step 902. If the presence of a stop line is detected from a captured image in front of the vehicle, a stop line presence flag Fc based on forward recognition is turned on in step 903, and a distance Lc up to the stop line is obtained in an image process in step 904. If there is no stop line, the flag Fc is turned off in step 905 and, in step 906, the value of the distance Lc is set to a large prescribed value, such as, for example, a maximum value that the distance Lc can take.

The forward recognition apparatus 2 receives road shape information Ir output by the navigation apparatus 1 at fixed intervals, in parallel to the above processing. In step 907, the forward recognition apparatus 2 checks the outlook status in front of the vehicle, according to the road shape information Ir. An outlook check is made based on the road shape information Ir from the navigation apparatus 1, and an outlook decision result is output in step 908. A status decision is made in the same way as in steps 505 and 506 in FIG. 5 in the first embodiment. If the outlook is determined to be fine, the outlook flag Fco, which indicates validity information about the forward recognition apparatus 2, is turned on in step 909, the validity information being sent to the vehicle velocity control ECU 3. If the outlook is determined to be poor, the outlook flag Fco is turned off in step 910. The recognition information flag Fc, distance information flag Lc, and outlook flag Fco based on the forward recognition apparatus 2 using a camera or the like are sent to the communication bus 7 in step 911.

The processing flow shown in FIG. 5 is then executed by the target vehicle velocity calculating unit 31 for halt stop control in the vehicle velocity control ECU 3 shown in FIG. 8, as described above. In this case, a decision in outlook check process steps 505 and 506 is made according to the status value of the flag Fco received in the second embodiment.

Third Embodiment

Figure 10:
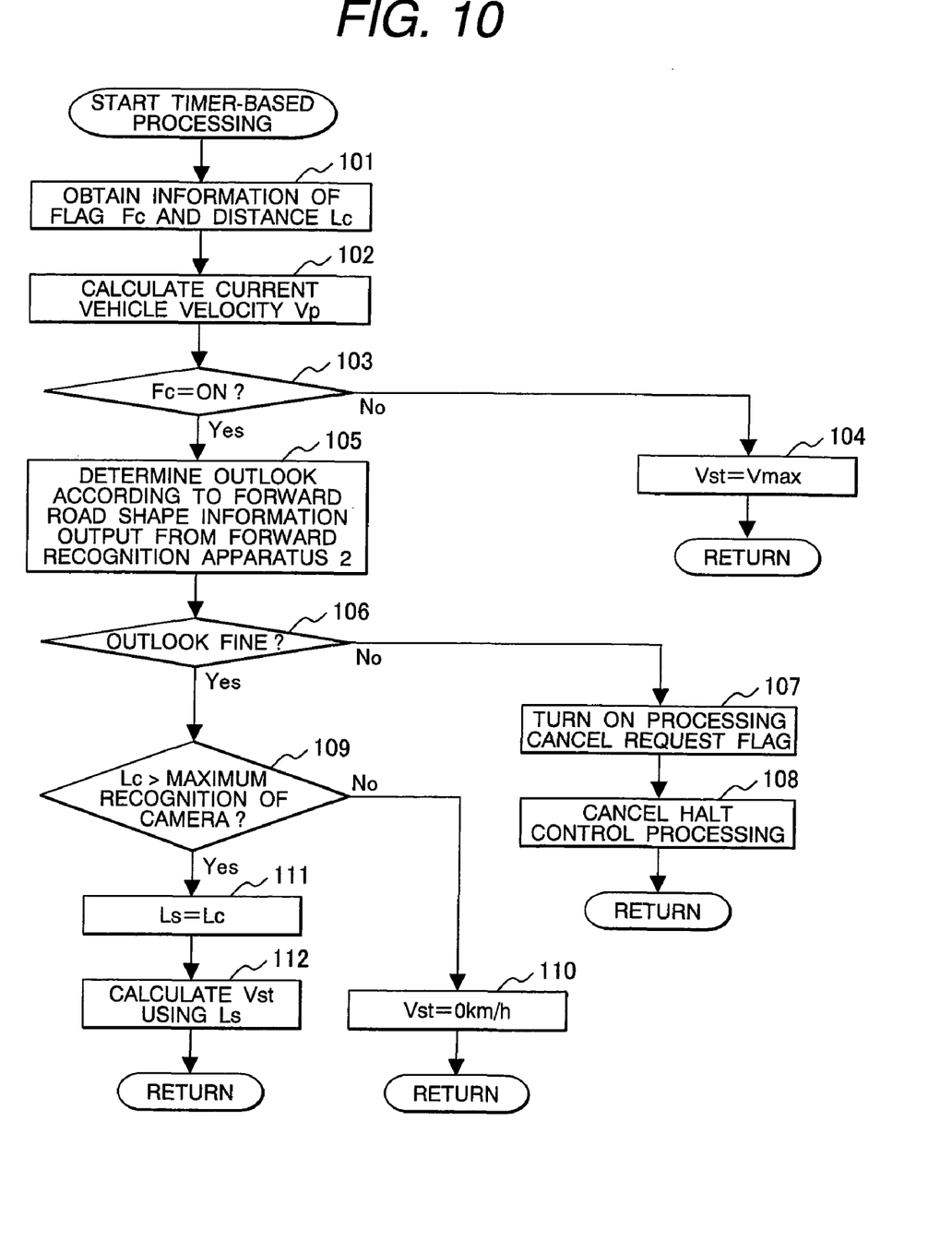
FIG. 10 is a flowchart indicating processing by the vehicle velocity control ECU 3 in the third example of the present invention.

FIG. 10 is a flowchart indicating processing by the vehicle velocity control ECU 3 in the third embodiment of the present invention.

The basic structure in the third embodiment is as shown in FIGS. 1 and 4. However, the navigation apparatus 1 in the third embodiment is not provided with a function for measuring a distance up to a target feature. In the third embodiment as well, flow of processing will be described for halt control processing by the driver assistance system controller, as in the first embodiment. In the target vehicle velocity calculating unit 31 shown in FIG. 4, processing described blow is executed at fixed intervals (10 ms, for example).

In step 101, the target vehicle velocity calculating unit 31 receives information about the flag Fc and distance Lc through the communication bus 7 from the forward recognition apparatus 2. In step 102, the target vehicle velocity calculating unit 31 obtains the wheel velocity Vw at the time of current driving from the wheel velocity sensors 6. The target vehicle velocity calculating unit 31 then calculates the current velocity Vp of the vehicle from these values and the radius of the tires mounted. In step 103, the target vehicle velocity calculating unit 31 checks whether the forward recognition apparatus 2 has detected a stop line within a prescribed range, according to the information received from the flag Fc.

If the flag Fc shows a value (0, for example) indicating that the flag is turned off, there is no stop line in the imaging area of the camera, so the target velocity Vst for halt control is set to the maximum value Vmax in step 104 so that the target velocity Vr2 for other driving control is not selected by the selector 33. If the flag Fc shows a value (1, for example) indicating that the flag is turned on, there is a stop line detected in the imaging area of the camera, so the outlook check process described in detail with reference to FIG. 5 is executed in steps 105 and 106.

If the outlook is determined to be poor, the cancel request signal flag is turned on in step 107 so that the halt control processing is canceled. The vehicle velocity controller 34 then cancels the halt control process in step 108.

If the outlook is determined to be fine in step 106, control is executed by use of only the distance information Lc from the forward recognition apparatus 2 using a camera or the like in step 109. If the vehicle comes too close to the stop line, and a change in the numerical value of the distance Lc and the angle of view of the camera indicate that the maximum recognition distance of a known camera is reached, it is determined in step 110 that the vehicle is sufficiently close to the stop line and thus the target velocity Vst for halt control is set to 0. Otherwise, assuming that the value of the target distance Ls is the distance Lc recognized by the forward recognition apparatus 2 (Ls=Lc) in step 111, the target velocity Vst for halt control is calculated from the value of the distance Ls to the stop line at that time in step 112. This calculation is performed using equation (1) as in the first embodiment.

In the third embodiment as well, after the process in step 107 is completed or when the processing is suspended in step 108, an alarm sound or voice information is output from a speaker mounted in the vehicle; the alarm sound notifies the driver that the driver assistance control processing has been suspended, and the voice information represents the suspension of the driver assistance control processing.

What is claimed is:

1. A driver assistance system controller, for a vehicle, which has a forward recognition apparatus for monitoring a situation around the vehicle and calculating a distance up to a particular object, a road information acquisition means for acquiring road information in front of the vehicle, and sensors for obtaining vehicle states including the velocity of the vehicle during driving, and executes driver assistance control for the vehicle, to which the forward recognition apparatus, the road information acquisition means, and the sensors are connected, according to output information from the forward recognition apparatus, the controller comprising a priority deciding means for determining which of the output information from the road information acquisition means and the output information from the forward recognition apparatus is to be given priority in execution of the driver assistance control, according to road shape information obtained from at least one of the forward recognition apparatus and the road information acquisition means.

2. The driver assistance system controller for a vehicle according to claim 1, wherein the priority deciding means makes a decision as to which of driver assistance control based on driving environment information obtained from either of the forward recognition apparatus or the road information acquisition means and driver assistance control based on driving environment information obtained from both of the forward recognition apparatus and the road information acquisition means is executed, as well as other decision.

3. The driver assistance system controller for a vehicle according to claim 2, further comprising a means for using the driving environment information obtained from both of the forward recognition apparatus and the road information acquisition means to calculate a distance up to a target stop position in the driver assistance control based on the driving environment information obtained from both of the forward recognition apparatus and the road information acquisition means.

4. The driver assistance system controller for a vehicle according to claim 2, further comprising a means for indicating, in the vehicle, a usage status of the output information from the forward recognition apparatus and/or the navigation apparatus in the driver assistance control while the driver assistance control is in progress.

5. The driver assistance system controller for a vehicle according to claim 1, wherein the road information acquisition means includes a navigation apparatus, and the decision means decides not to allow the use of the output information from the navigation apparatus when distance up to a particular point falls to or below a prescribed value, the distance being output from the navigation apparatus.

6. The driver assistance system controller for a vehicle according to claim 5, wherein the decision means decides not to allow the use of the output information from the forward recognition apparatus when the current driving position has a road shape that impairs forward outlook, the road shape including a point before the vehicle enters a dark place at least one of a tunnel, the front of the top of an uphill, and the front of a blind curve.

7. The driver assistance system controller for a vehicle according to claim 5, further comprising a means for indicating non-use of the output information in the vehicle.

* * * * *